US010803691B2

(12) United States Patent
Schletti et al.

(10) Patent No.: US 10,803,691 B2
(45) Date of Patent: Oct. 13, 2020

(54) DEVICE FOR DETECTING A MAGNETIC SECURITY FEATURE OF A VALUE DOCUMENT AND METHOD FOR MEASURED VALUE COMPENSATION FOR THE DETECTION OF A MAGNETIC SECURITY FEATURE OF A VALUE DOCUMENT

(71) Applicant: CI Tech Sensors AG, Burgdorf (CH)

(72) Inventors: Reto Schletti, Burgdorf (CH); Elisabeth Paul, Burgdorf (CH)

(73) Assignee: CI Tech Sensors AG, Burgdorf (CH)

(*) Notice: Subject to any disclaimer, the term of this patent is extended or adjusted under 35 U.S.C. 154(b) by 0 days.

(21) Appl. No.: 16/224,099

(22) Filed: Dec. 18, 2018

(65) Prior Publication Data

US 2019/0236884 A1 Aug. 1, 2019

(30) Foreign Application Priority Data

Dec. 22, 2017 (EP) .................................... 17210229

(51) Int. Cl.

| | |
|---|---|
| ***G06Q 40/00*** | (2012.01) |
| ***G07D 11/00*** | (2019.01) |
| ***G07F 19/00*** | (2006.01) |
| ***G07D 7/04*** | (2016.01) |
| ***G07D 7/17*** | (2016.01) |
| ***G07D 11/16*** | (2019.01) |
| ***G07D 7/004*** | (2016.01) |

(52) U.S. Cl.

CPC ............... *G07D 7/04* (2013.01); *G07D 7/004* (2013.01); *G07D 7/17* (2017.05); *G07D 11/16* (2019.01)

(58) Field of Classification Search

USPC ........................................ 235/379, 449, 493

See application file for complete search history.

(56) References Cited

U.S. PATENT DOCUMENTS

| | | | | |
|---|---|---|---|---|
| 9,171,411 | B2 * | 10/2015 | Schmalz | G07D 7/04 |
| 2013/0161391 | A1 * | 6/2013 | Schmalz | G06K 7/087 235/449 |
| 2015/0160326 | A1 * | 6/2015 | Schutzmann | G07D 7/04 324/202 |

(Continued)

OTHER PUBLICATIONS

Extended European Search Report filed in corresponding European Application; 7 pages.

*Primary Examiner* — Tuyen K Vo

(74) *Attorney, Agent, or Firm* — Black, McCuskey, Souers & Arbaugh LPA

(57) ABSTRACT

An apparatus for detecting a magnetic security feature of a valuable document including a transport apparatus configured to transport the valuable document through the apparatus, sensors configured as magnetic sensors and having at least two security feature sensors and at least one compensation sensor, and an evaluation unit configured to receive the signals output by the sensors, wherein the sensors are arranged and configured in a line parallel to the transport plane and transversely with respect to the direction of transport. The sensors are arranged at a distance from the transport plane such that the distance of the security feature sensors is configured to capture a security feature by means of at least one of the security feature sensors, and that the distance of the compensation sensor is configured not to capture a security feature by means of the compensation sensor.

20 Claims, 5 Drawing Sheets

(56) References Cited

U.S. PATENT DOCUMENTS

| | | | | |
|---|---|---|---|---|
| 2015/0279140 | A1* | 10/2015 | He | G07D 7/00 194/320 |
| 2017/0352222 | A1 | 12/2017 | Liu et al. | |

* cited by examiner

Figure 1
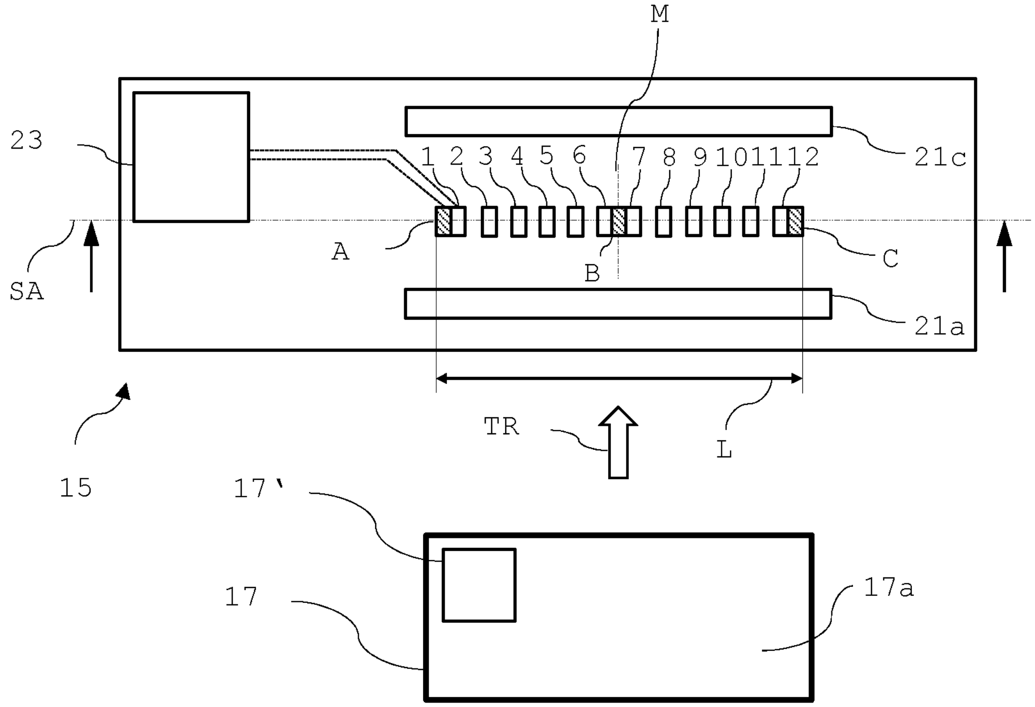
Figure 1A
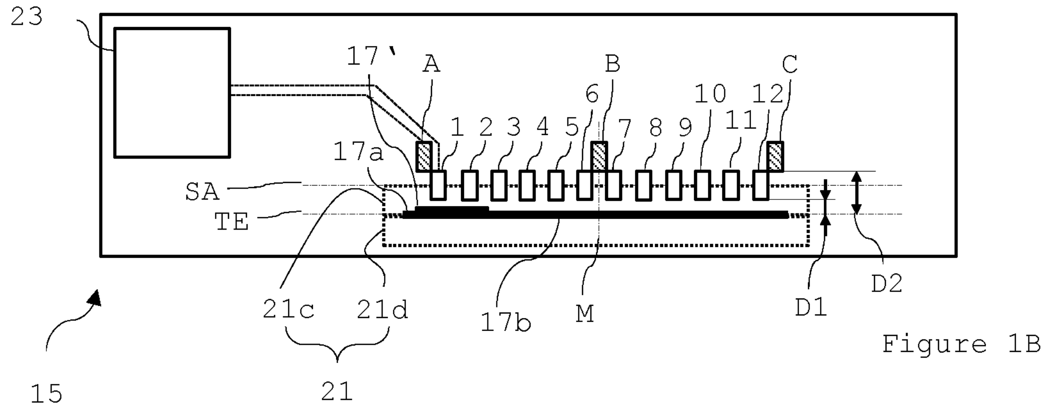
Figure 1B

DEVICE FOR DETECTING A MAGNETIC SECURITY FEATURE OF A VALUE DOCUMENT AND METHOD FOR MEASURED VALUE COMPENSATION FOR THE DETECTION OF A MAGNETIC SECURITY FEATURE OF A VALUE DOCUMENT

CROSS-REFERENCE TO RELATED APPLICATION

This application claims priority to and claims the benefit of European Patent Application Serial No. 17 210 229.5, which was filed Dec. 22, 2017.

TECHNICAL FIELD

The present invention relates to an apparatus for detecting a magnetic security feature of a valuable document and to a method for measured value compensation for the detection of a magnetic security feature of a valuable document.

BACKGROUND

Valuable documents such as vouchers or, by way of example, banknotes, cheques, shares, papers with the security imprint, certificates, ID cards, passports, entrance tickets, travel tickets, coupons, identification or access cards or the like can be provided with security features on their front side, their rear side and/or in a manner embedded in the material, in order to hamper or prevent forgery thereof, and to be able to check the authenticity thereof. In the illustrative case of a banknote, some of these security features, e.g. an area of the banknote that is printed with magnetic ink, can be machine-testable.

Banknotes are dispensed to customers by means of automated teller machines, e.g. for a payment from a bank account, and/or automated teller machines can receive banknotes from customers, e.g. for a payment into a bank account. When a banknote is handled by an automated teller machine, an authenticity check on the banknote is effected on the basis of the security features by a handling apparatus of the automated teller machine, in order to pull in the banknote in the case of a forgery. The check on the e.g. magnetic security feature in the handling apparatus is effected e.g. by magnetoresistive sensors, which also capture magnetic fields other than those of the magnetic security feature, however, for example from drive motors, fans, etc., of the automated teller machine.

On account of the small size, in comparison with the other magnetic fields, of the magnetic field produced by the magnetic security feature, other magnetic fields hamper safe capture of the magnetic security feature—and hence the authenticity check on the banknote.

In response to this, an apparatus and a method for measured value compensation during the capture of magnetic security features in a handling apparatus are provided that allow safe automatic capture of magnetic security features in a handling apparatus.

SUMMARY

An apparatus for detecting a magnetic security feature of a valuable document according to an exemplary embodiment can have a transport apparatus, sensors and an evaluation unit. The apparatus can be configured to receive the valuable document, to check it and to dispense it again (handling of the valuable document). Also, the apparatus can be configured to capture other types of security features in addition to a magnetic security feature. A valuable document (e.g. a banknote) can be a flat, for example rectangular, item and can have a first flat side and a second flat side opposite this first flat side. In the case of a rectangular valuable document, the latter can have a long edge and, in relation thereto, a short edge. Provided on one of the flat sides and/or in the material of the valuable document itself there can be at least one machine-readable magnetic security feature. The apparatus can be provided in an automated teller machine, for example. Also, the apparatus can likewise be provided in numerous types of machines handling valuable documents, e.g. in paying-in, travel ticket, grocery and beverage machines.

The transport apparatus can be configured, by way of example, to transport the valuable document through the apparatus on a (e.g. planar or curved) transport plane in a direction of transport (e.g. by means of roller and/or conveyor belt means). The transport plane can be oriented (e.g. at least substantially) perpendicularly with respect to a direction of gravity or (e.g. at least substantially) parallel to the direction of gravity. During transport of the valuable document via the transport apparatus, the flat sides of the valuable document can extend (e.g. at least substantially) parallel to the transport plane. The valuable document can be transportable by the transport apparatus with a long or short edge first, for example, with any of the flat sides pointing upward, and is not stipulated for one type of valuable documents.

The sensors can be configured, by way of example, as magnetic-field-sensitive sensors (“magnetic sensors”), e.g. as magnetoresitive sensors. By way of example, the electrical resistance of the sensors can be changed by applying an external magnetic field to the sensors, and in this way a magnetic security feature can be capturable contactlessly when the valuable document is transported past the sensors. By way of example, the sensors can be embodied as Hall sensors that contactlessly capture a magnetic field and output a corresponding voltage signal. However, other types of sensors are also possible, for example optical, tactile and/or capacitive sensors. The sensors provided are at least two (for example three, four, five, six, seven, eight, nine, ten, eleven, twelve or more) security feature sensors and at least one (e.g. two, three or more) compensation sensor(s). The number of sensors is geared to the valuable document to be handled. The security feature sensors can be configured to capture a magnetic field inside the transport plane, which magnetic field is produced e.g. by a security feature or by a disturbance by another component (e.g. an electric drive motor of the transport apparatus), and the compensation sensor can be configured to capture a magnetic field outside (e.g. above) the transport plane, which magnetic field is produced e.g. by the disturbance. The sensors can be arranged in a (e.g. straight or curved) line (e.g. at least substantially) parallel to the transport plane and (e.g. at least substantially) transversely with respect to the direction of transport. By way of example, the line of sensors can extend (e.g. at least substantially) along the entire length of the long edge of the valuable document, i.e. the sensors can be distributed over the entire length of the long edge of the valuable document. Alternatively, the line of sensors can be at an angle to the direction of transport and alternatively the line of sensors can correspond only to a partial length of the long edge of the valuable document. The sensors can e.g. further be configured so that transport of the valuable document past the line of sensors results in the security feature sensors each capturing an individual strip of the valuable document in the direction of transport. By way of example, the strips run (e.g. at least substantially) parallel to the short edge of the valuable document. In this way, the entire valuable document is capturable on transport through the apparatus, for example. Further, the sensors can be arranged at a distance from the transport plane. The distance of one of the security feature sensors can be configured e.g. such that a security feature is capturable by the security feature sensor, and the distance of the compensation sensor can be configured such that a security feature is not capturable by the compensation sensor. By way of example, one of the security feature sensors and the compensation sensor can be arranged above one another (e.g. partially or completely overlapping) relative to the transport plane, for example in order to save space along the line of sensors.

The evaluation unit can be configured e.g. to receive the signals output by the sensors. In this regard, the evaluation unit can be connected to the sensors by means of electrical and/or optical lines, for example. Further, the evaluation unit can be configured, by way of example, to use the received signals to ascertain whether a security feature sensor captures a security feature.

The apparatus can, by way of example, further be configured so that the compensation sensor(s) is or are arranged symmetrically with respect to a centre of the line. The centre of the line can correspond (e.g. at least substantially) to a centre of that edge of the valuable document transported first or of a maximum transport width inside which a valuable document is transportable through the apparatus. If a single compensation sensor is used, for example, it can be arranged on the centre line. If e.g. two compensation sensors are used, these can be arranged at the start and end of the line. If e.g. three compensation sensors are used, these can be arranged at the start, in the centre and at the end of the line. By way of example, the compensation sensors can be distributed uniformly along the line of sensors in order to capture magnetic fields uniformly along said line. Also, the compensation sensors can be arranged in a region of the line of sensors in which a strong disturbing magnetic field is to be expected.

The distance of the security feature sensors from the transport plane (for example from the valuable document transported in the transport plane) can be approximately 1.8 mm, preferably approximately 1.3 mm and more preferably approximately 0.5 mm, for example, and the distance of the compensation sensor(s) from the transport plane can be approximately 5 mm to 10 mm and preferably approximately 8 mm. Therefore, capture of a security feature by the security feature sensor is ensured and capture by the compensation sensor is avoided.

The sensors can further be configured e.g. as magnetic sensors of the same type.

The valuable document can be e.g. one of the following: a banknote, a cheque, an identity card, a passport, a travel ticket and a share document.

The method for detecting a magnetic security feature of a valuable document according to an exemplary embodiment can involve a valuable document being transported through an apparatus having at least two security feature sensors and at least one compensation sensor (e.g. by a transport apparatus of the apparatus), wherein the sensors are configured as magnetic sensors (e.g. magnetoresistive sensors or Hall sensors). If no valuable document is transported past the sensors, the following steps can be performed: capturing, by the security feature sensors and the compensation sensor, a respective measured value (e.g. of a disturbing magnetic field, wherein the measured value is outputable e.g. as an analogue voltage signal), ascertaining (e.g. by means of an evaluation unit) a disturbance variable of the respective security feature sensor and compensation sensor based on the measured value of said sensor, ascertaining (e.g. by means of the evaluation unit) a weighting factor for the respective security feature sensor on the basis of a distance (e.g. along the line of sensors) of the security feature sensor from the compensation sensor, calculating (e.g. by means of the evaluation unit) a compensation factor for the respective security feature sensor (e.g. the signal thereof) based on the ratio of the captured disturbance variables of the security feature sensor and of the compensation sensor and the weighting factor (for example the compensation factor is influenced all the less by the weighting factor the further away the applicable security feature sensor from the compensation sensor), calculating (e.g. by means of the evaluation unit) a compensation value for the respective security feature sensor based on the compensation factor and the measured value, and calculating (e.g. by means of the evaluation unit) a compensated measured value of the respective security feature sensor. A security feature sensor with such compensation can safely capture a magnetic security feature of a valuable document without additional measures (e.g. magnetic screening from magnetic disturbance fields).

The method can, by way of example, further detect a security feature by using the compensated measured value when a valuable document is transported past the sensors.

The disturbance variable can be ascertained e.g. by using a standard deviation or a route mean square of multiple measured values.

In a case in which a single compensation sensor is used, for example, the method can involve the ascertaining of the weighting factor resulting in a weighting factor that is the same for all the security feature sensors being ascertained. Further, e.g. in a case in which multiple compensation sensors are used, the ascertaining of the weighting factor can result in one weighting factor per compensation sensor being ascertained for a respective security feature sensor that decreases as the distance of the security feature sensor from the associated compensation sensor increases. By way of example, in the case of two compensation sensors, at each end of the line of sensors, a large weighting factor is ascertained for one security feature sensor, situated close to one compensation sensor, and a small weighting factor is ascertained for the other security feature sensor, situated further away from the one compensation sensor. This is embodied analogously for the other compensation sensor, which means that in this case each security feature sensor is provided with two weighting factors in order thereby to reduce inaccuracies in the weighting of the more remote of the compensation sensors, since the disturbance captured by the compensation sensor can have a different (unknown) strength that the security feature sensor that is far away.

Further, the method in the case of the single compensation sensor, for example, can involve the calculating of the compensation factor for the security feature sensor resulting in an extrapolation of the disturbance variable ratio from the compensation sensor being effected based on the weighting factor. By way of example, the same weighting factor is used for all the security feature sensors or an e.g. linearly falling weighting factor is used for the security sensors starting from the compensation sensor as the distance therefrom increases. Further, in the case of multiple compensation sensors, for example, a piecewise linear interpolation of the disturbance variable ratio between the compensation sensors can be effected based on the weighting factors. It is possible to interpolate e.g. in each case from compensation sensor to compensation sensor. By way of example, if the compensation sensors are not arranged at the start or end of the line of sensors, i.e. if further security feature sensors are arranged outside the compensation sensors, the interpolation between the compensation sensors can be used to extrapolate the disturbance variable ratio for the subsequent security feature sensors. Therefore, the compensation factor is calculable for different sensor arrangements.

Further, the method can involve e.g. the weighting factor being ascertained by virtue of a value in the order of magnitude of the signal noise of the sensors being added to the weighting factor (e.g. additionally).

BRIEF DESCRIPTION OF THE DRAWINGS

Exemplary embodiments of the apparatus and of the method are depicted in the figures and are explained in more detail below.

FIGS. 1A and 1B show a schematic arrangement of security feature and compensation sensors in an apparatus for handling banknotes, FIG. 1A showing a plan view and FIG. 1B showing a front view of the apparatus.

DETAILED DESCRIPTION

Figure 2:
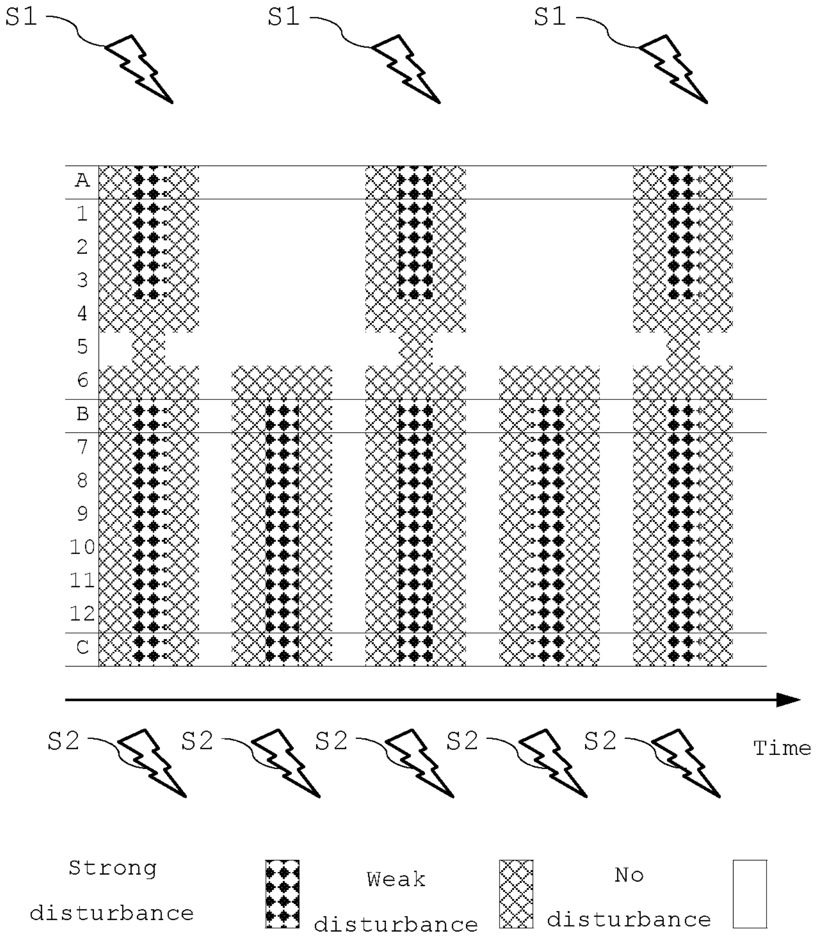
FIG. 2 shows a schematic depiction of disturbances and the influence thereof on the measured values for an arrangement of sensors as shown in FIGS. 1A and 1B.

In the detailed description that follows, reference is made to the accompanying drawings, which form part of this description and show for illustrative purposes specific embodiments in which the invention can be implemented. In this regard, direction terminology such as, for instance, "at the top", "at the bottom", "to the left", "to the right", etc., is used with respect to the orientation of the figure(s) described. Since components of embodiments can be positioned in a number of different orientations, the direction terminology serves for illustration and is not restrictive in any way whatsoever. It further goes without saying that the indexing of features by means of e.g. "first", "second", etc., also serves only for illustration and is not restrictive in any way whatsoever. It likewise goes without saying that the features of the different exemplary embodiments described herein can be combined with one another unless specifically indicated otherwise. Further, method steps can be performed in a different order from that described; by way of example, the ascertaining of the weighting factors described below can be effected independently of other method steps and/or e.g. the decision as to whether there is a banknote at the sensors can be taken at any point in the method after the capture of the measured values without a banknote that is described below. The detailed description that follows should therefore not be interpreted in the restrictive sense, and the scope of protection of the present invention is defined by the appended claims.

In the figures, identical or similar elements are provided with identical reference signs where expedient. Further, thicknesses of lines can be shown in exaggerated fashion in the figures to aid depictability; by way of example, the thicknesses of a banknote or of the security feature can be depicted in exaggerated fashion in the figures, but can actually be small in relation to other dimensions.

This also applies to the "transport plane" as used herein, which can be e.g. a centre plane of a transport gap inside which the banknotes are transported. Such a transport gap can have a thickness of e.g. approximately 0.1 mm to 2 mm. That is to say that the banknotes can e.g. also be transported above or below the transport plane inside the transport gap. For the purpose of improved depictability, the banknotes are subsequently shown in the transport plane.

FIG. 1A and FIG. 1B show an arrangement comprising a first to twelfth security feature sensor 1-12 and a first to third compensation sensor A, B, C in an apparatus 15 for handling valuable documents 17, FIG. 1A being a plan view and FIG. 1B being a front view of the handling apparatus 15. The apparatus can be installed in an automated teller machine, not shown, for example, and can further be configured to capture security features other than a magnetic one. In this regard, the apparatus 15 can have further sensors. Further, the description that follows also relates, analogously, to other arrangements of security feature and compensation sensors having, by way of example, two, three, four, five, etc., security feature sensors and having one, two, three, four, etc., compensation sensors.

As shown in FIG. 1A, a banknote 17 is introducible into the handling apparatus 15 from below as a valuable document, the banknote 17 being a rectangular, flat item made of e.g. paper having a first flat side 17*a* and a second flat side 17*b* opposite the first flat side 17*a*. An area of the first flat side 17*a* is printed with magnetic ink and is a magnetic security feature 17' capturable by the security feature sensors 1-12. Alternatively or additionally, the second flat side 17*b* can also have a magnetic security feature. Moreover, it is also possible for the magnetic security feature to be embedded in the banknote, for example in the style of a security thread.

Further, the banknote 17 is not defined for one type of banknote, but rather is representative of a multiplicity of different banknotes, e.g. of different denomination (physical size of the banknote) of a or different currencies. To simplify depiction, the further description describes a case in which the banknote 17 has its first flat side 17*a* and the security feature 17' pointing upward and one of its long edges transported through the apparatus 15 first; however, it is likewise possible for the second flat side 17*b* to point upward, for the banknote 17 to have one of its short edges transported through the apparatus 15 first and/or for the security feature 17' to be arranged in the material of the banknote 17.

The banknote 17 is introducible into the apparatus 15 by e.g. a banknote collector (not depicted) and transportable through the apparatus 15 to the top side in a direction of transport TR by a transport apparatus 21 on a transport plane TE (plane of the drawing). The first and second flat sides 17*a*, 17*b* are arranged in the transport plane TE in this case. By way of example, the transport apparatus 21 has at least one pair of rollers 21*a*, 21*b* that are arranged above and below the transport plane TE axially parallel transversely with respect to the direction of transport TR and form a gap in which the banknote 17 is transportable through the rollers 21*a*, 21*b* (FIG. 1A and FIG. 1B show two pairs of rollers by way of example, the rollers 21*a*, 21*c* and 21*d* being visible).

For the purposes of transport, the rollers 21*a*, 21*b* and 21*c*, 21*d* each make contact with one of the flat sides 17*a*, 17*b* of the banknote 17, and at least one of the rollers 21*a*, 21*b*, 21*c*, 21*d* is driven, e.g. by an electric motor (not shown). Further, the transport apparatus 21 can have a banknote guide (not shown) that prevents the banknote from leaving the transport plane TE; this can be e.g. a guide plate on which the banknote bears (e.g. slides along) during transport. The transport speed is controllable by an evaluation unit 23 that to this end is connected to the transport apparatus 21 (not shown). After passing through the apparatus 15, the banknote 17 is dispensable at the top side of the apparatus 15, e.g. into a storage compartment (not shown).

The security feature and component sensors 1-12, A-C are arranged on an axis SA running transversely with respect to the direction of transport TR and parallel to and above the transport plane TE. The sensors are, when considered from left to right in FIG. 1A and starting with the first compensation sensor A, arranged in the order first compensation sensor A, first to sixth security feature sensors 1-6, second compensation sensor B, seventh to twelfth security feature sensors 7-12 and third compensation sensor C, a length L of the line of sensors stretching from the first to the third compensation sensor A, C. The length L can extend, by way of example, at least substantially over the length of the edge of the banknote 17 by which it is transported forward. The line L can have between its ends a centre M on which the second compensation sensor B is arranged. The security feature sensors 1-12 are in this case arranged symetrically with respect to the centre M at equal distances along the line L, the compensation sensors A-C being arranged directly next to the first, between the sixth and seventh and next to the twelfth security sensors 1, 6, 7, 12. Instead of the offset arrangement of the sensors, the compensation sensors A-C can be arranged so as to overlap the security feature sensors 1-12; by way of example, the first compensation sensor A can be arranged above the first security feature sensor 1 and the third compensation sensor C can be arranged above the twelfth security feature sensor 12, in order to keep the length L short. The security feature and compensation sensors 1-12, A-C can be arranged on different sides of the transport plane TE. The evaluation unit 23 is connected to the sensors by means of lines (two dashed lines are shown by way of example in FIG. 1A and FIG. 1B), in order to receive the signals of said sensors and to supply said sensors with power. By way of example, the sensors output an analogue voltage signal on the basis of a measured magnetic field (measured value). Further, the evaluation unit 23 can be connected to a communication system of the automated teller machine in order to receive commands from the latter and to transmit information.

FIG. 1B is a view of the axis SA in FIG. 1A and schematically depicts a front view of the apparatus 15, with the direction of transport TR extending into the plane of the drawing. The rollers 21*c*, 21*d* of the transport apparatus 21 are shown in dotted fashion in the apparatus 15 in the background. The security feature sensors 1-12 are arranged perpendicularly with respect to the transport plane TE (above) at a first distance D1, and the compensation sensors A-C are arranged perpendicularly with respect to the transport plane TE at a second distance D2. The second distance D2 is greater than the first distance D1, which means that the compensation sensors A-C cannot capture the security feature 17', whereas the security feature sensors 1-12 can capture the security feature 17' when it is transported through below the applicable sensors. Since any disturbing magnetic fields are capturable by both the compensation and the security feature sensors A-C, 1-12, yet the security features 17' of the banknotes 17 are capturable only by the security feature sensors 1-12, the compensation sensors A-C can be used to compensate for the influence of the disturbing magnetic fields on the security feature sensors 1-12 on the basis of the measured values of said compensation sensors. The arrangement described above and the method described below can be used with a small number of compensation sensors to compensate a comparatively large number of security feature sensors.

FIG. 2 shows a schematic depiction of disturbances and the influence thereof on the measured values for an arrangement of sensors as shown in FIG. 1A and FIG. 1B.

FIG. 2 schematically shows a plan view of the transport plane TE of the apparatus 15, disturbances arising in the transport plane TE as a result of other magnetic fields. In the depiction, the measured values output by the compensation and security feature sensors 1-12, A-C (ordinate) are plotted over time (abscissa), i.e. a signal waveform for the sensors 1-12, A-C is depicted. The measured values of the sensors 1-12, A-C represent a state without a captured security feature 17', but with captured disturbing magnetic fields. At the upper and lower edges of the depiction, a first and a second disturbing magnetic field occur cyclically, for example at the upper edge as a result of an electric motor and at the lower edge as a result of a fan of the automated teller machine. The disturbances S1 (at the top) and S2 (at the bottom) brought about are exemplary and can occur at different strengths, frequency, together with further disturbances, etc. The measured values of the sensors 1-12, A-C under the influence of the disturbances S1, S2 are classified into the categories “strong disturbance”, “weak disturbance” and “no disturbance” by way of example in this case, there being numerous intermediate stages (not shown), since the measured values are analogue voltage values, for example. A strong disturbance causes a large measured value, a weak disturbance causes a small measured value and no disturbance results in e.g. the usual noise of the sensor 1-12, A-C as an output (measured value).

It can be seen that the disturbance S1 occurs in sync at half the frequency in relation to the disturbance S2. It can further be seen that the disturbances S1, S2 have a strong to no influence on the sensors, depending on the occurrence in time, i.e. the disturbances S1, S2 are variable over time. On the basis of the disturbance S1, the first compensation sensor A and the first security feature sensor to the fifth security feature sensor 1-5 output a large, a small or no measured value (e.g. negligible noise), i.e. are greatly influenced to uninfluenced by the disturbance S1. On the basis of the disturbance S2, the second and third compensation sensors B, C and the sixth security feature sensor to the twelfth security feature sensor 6-12 output a large, a small or no measured value (e.g. negligible noise), i.e. are greatly influenced to uninfluenced by the disturbance S2. If a security feature 17' of a banknote 17 is supposed to be captured, if e.g. the disturbance S2 is captured at the same time, e.g. at least the seventh to twelfth security feature sensors 7-12 cannot distinguish the security feature 17' from the disturbance S2, which means that the security feature 17' is not or erroneously capturable.

Figure 3:
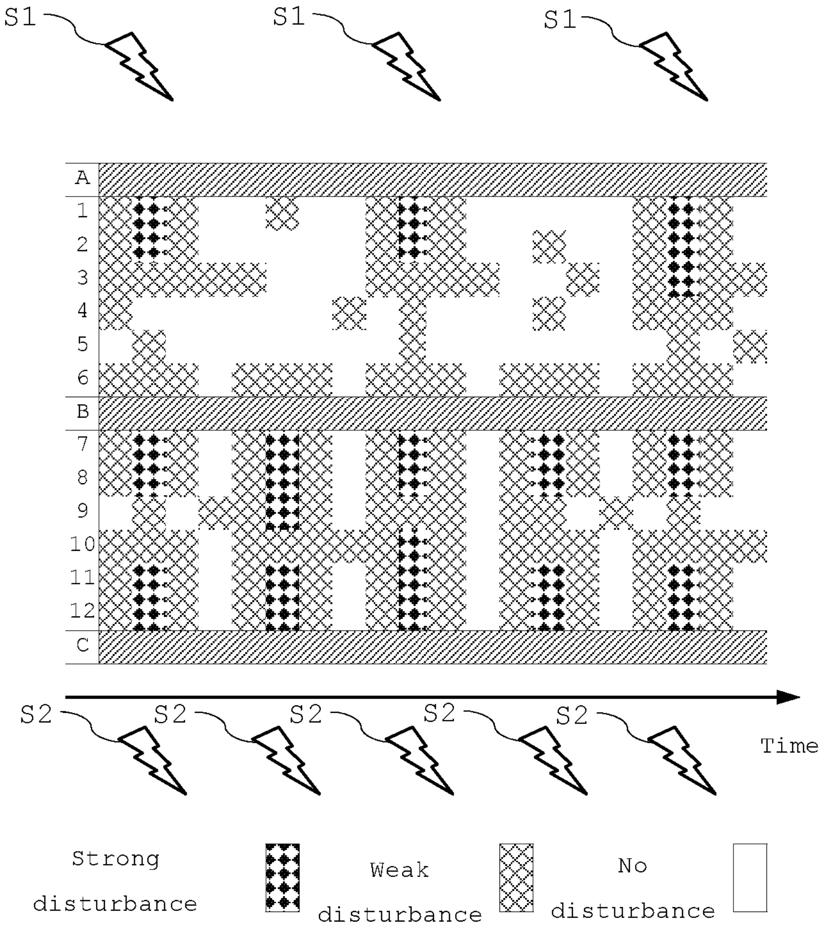
FIG. 3 shows a schematic depiction of compensation values for an arrangement of sensors as shown in FIGS. 1A and 1B.
Figure 4:
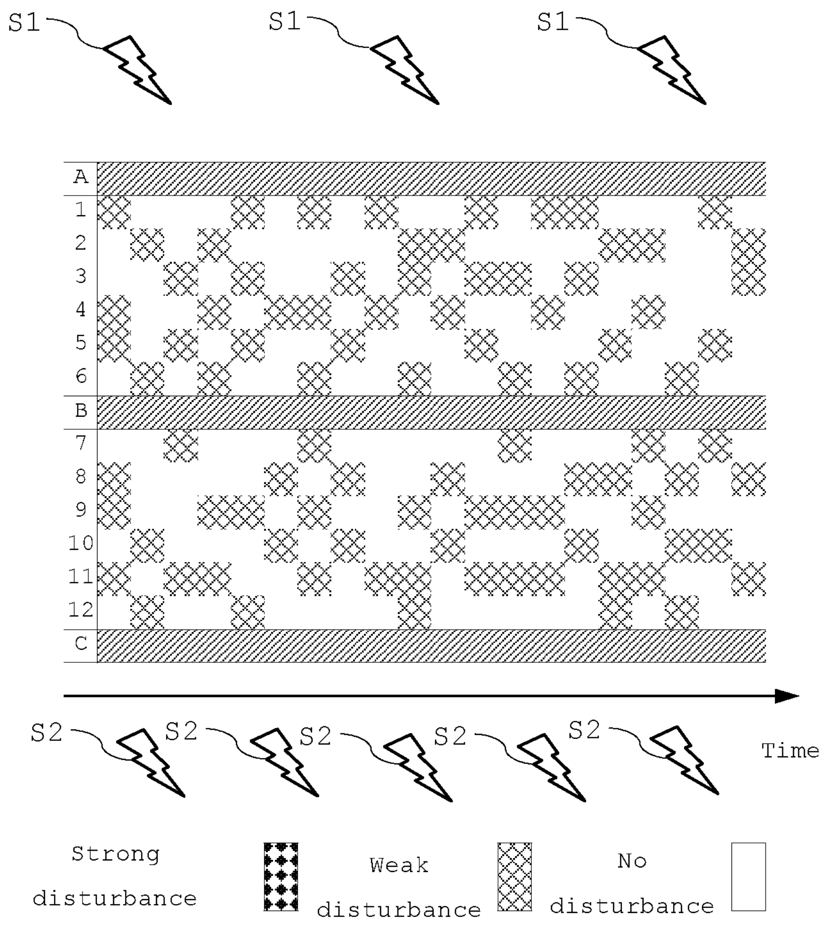
FIG. 4 shows a schematic depiction of compensated measured values for an arrangement of sensors as shown in FIGS. 1A and 1B.
Figure 5:
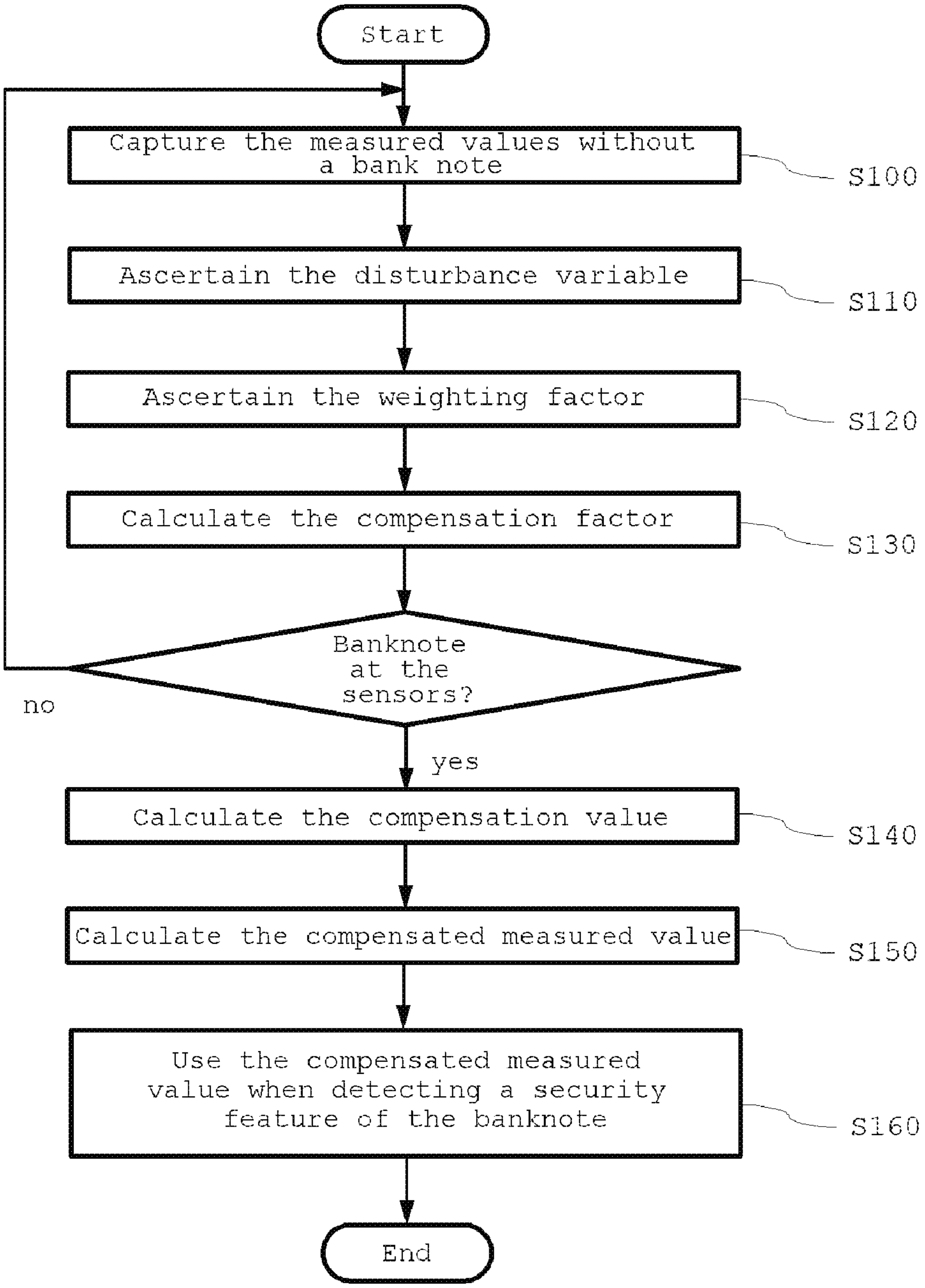
FIG. 5 shows a flowchart for a method for measured value compensation for the capture of banknote security features in an apparatus for handling banknotes.

With reference to FIG. 2 to FIG. 5, a method for measured value compensation and for using a compensated measured value during detection of a magnetic security feature 17' of a banknote 17 is furthermore described, the individual method steps being depicted in FIG. 5. The method can be started e.g. under the control of the evaluation device 23, e.g. when a request is made by the automated teller machine.

According to the method that follows, it is possible to take into consideration the influence of the disturbances S1, S2 on the security feature sensors 1-12 in order to ensure safe capture of a security feature 17' of a banknote 17 without complex magnetic screening of the apparatus 15. Subsequently, to simplify depiction, the index i (i=first security feature sensor to twelfth security feature sensor 1 to 12) is also used for values/variables relating to the security feature sensors 1-12 and the index j (j=first compensation sensor to third compensation sensor A to C) is also used for values/variables relating to the compensation sensor.

When no banknote is transported past the sensors, e.g. in a period between two successive banknotes, an associated measured value $M_j$, $M_i$ is captured (S100) for each compensation and security feature sensor A-C, 1-12, for example in the style of an analogue voltage signal (raw signal). The measured values $M_j$, $M_i$ are captured by the evaluation device 23, which receives the voltage signals from each of the sensors A-C, 1-12. In FIG. 2, the measured values $M_j$, $M_i$ that are output by the compensation and security feature sensors A-C, 1-12 on the basis of the disturbances S1, S2 are depicted over the course of time.

After capture, a respective disturbance variable $S_j$, $S_i$ of the compensation and security feature sensors A-C, 1-12 is ascertained (S110) from the measured values $M_j$, $M_i$ by the evaluation device 23. The disturbance variable $S_j$, $S_i$ can be ascertained by using the standard deviation or the route mean square of multiple successive measured values $M_j$, $M_i$ of the compensation and security feature sensors A-C, 1-12, for example. The measured values $M_j$, $M_i$ are captured over a predetermined time without a banknote being captured in this time, i.e. the disturbance variables $S_j$, $S_i$ are ascertained only from the measured values $M_j$, $M_i$ of the disturbances S1, S2. By way of example, the disturbance variables $S_j$, $S_i$ can be ascertained as a disturbance amplitude in regard to an undisturbed output signal from the sensors.

Subsequently to the ascertainment, a weighting factor $G_{ji}$ for the respective security feature sensor 1-12 is ascertained (S120) on the basis of a distance of the security feature sensor 1-12 from the compensation sensor A-C along the line L. On account of the symmetric arrangement of the compensation sensors A-C, i.e. at the start, in the centre M and at the end of the line L, precise disturbance variables $S_j$, $S_i$ are present at three points on the line L as a result of the compensation sensors A-C, which disturbance variables can become more imprecise as a distance from the compensation sensors A-C increases, however. That is to say that a disturbance variable SB can correspond, e.g. for the case of the disturbance S2 (strong disturbance), to the disturbance of the seventh and eighth security feature sensors 7, 8 (strong disturbance), whereas the disturbance variable SB incorrectly maps the disturbance S2 of the fourth and fifth security feature sensors 4, 5 (no disturbance). Consequently, weighting of the disturbance variables $S_j$, $S_i$ of the compensation sensors A-C is necessary as the distance therefrom increases, said weighting being effected in the style of interpolation in this case. For this, the weighting factors $G_{ji}$ are determined from the security feature sensors 1-12, said weighting factors being used to take into consideration the influence of the compensation sensors A-C. The further away a compensation sensor A-C from a security feature sensor 1-12, the smaller the applicable weighting factor $G_{ji}$. The respective weighting factors $G_{ji}$ are obtained for the security feature sensors 1-12 on the basis of the compensation sensors A-C as follows:

TABLE 1

| | | Security Feature Sensor | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Compensation Sensor | A | $G_{A1}$ 11/11 | $G_{A2}$ 9/11 | $G_{A3}$ 7/11 | $G_{A4}$ 5/11 | $G_{A5}$ 3/11 | $G_{A6}$ 1/11 | $G_{A7}$ 0 | $G_{A8}$ 0 | $G_{A9}$ 0 | $G_{A10}$ 0 | $G_{A11}$ 0 | $G_{A12}$ 0 |
| | B | $G_{B1}$ 0 | $G_{B2}$ 2/11 | $G_{B3}$ 4/11 | $G_{B4}$ 6/11 | $G_{B5}$ 8/11 | $G_{B6}$ 10/11 | $G_{B7}$ 10/11 | $G_{B8}$ 8/11 | $G_{B9}$ 6/11 | $G_{B10}$ 4/11 | $G_{B11}$ 2/11 | $G_{B12}$ 0 |
| | C | $G_{C1}$ 0 | $G_{C2}$ 0 | $G_{C3}$ 0 | $G_{C4}$ 0 | $G_{C5}$ 0 | $G_{C6}$ 0 | $G_{C7}$ 1/11 | $G_{C8}$ 3/11 | $G_{C9}$ 5/11 | $G_{C10}$ 7/11 | $G_{C11}$ 9/11 | $G_{C12}$ 11/11 |

Table 1 reveals that, by way of example, the measured value $M_5$ of the security feature sensor 5 is weighted at 3/11 for the compensation sensor A and at 8/11 for the compensation sensor B, and the measured value of the compensation sensor C is not taken into consideration. Table 1 further reveals that the weighting factors $G_{ji}$ for a respective security feature sensor 1-12 complement one another to produce 11/11, i.e. to produce 1. Therefore, the security feature sensors 1-12, considered absolutely, are all weighted equally, in each case with different proportions determined by the weighting factors $G_{ji}$.

For the exemplary cases of a single compensation sensor B in the centre M of the line L or of two compensation sensors A, C at the start and end of the line L, the extrapolation or interpolation obtained is the following weighting factors $G_{ji}$ as per table 2 (single compensation sensor B) and table 3 (two compensation sensors A, C):

TABLE 2

| | | Security Feature Sensor | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Compensation Sensor | B | $G_{B1}$ 11/11 | $G_{B2}$ 11/11 | $G_{B3}$ 11/11 | $G_{B4}$ 11/11 | $G_{B5}$ 11/11 | $G_{B6}$ 11/11 | $G_{B7}$ 11/11 | $G_{B8}$ 11/11 | $G_{B9}$ 11/11 | $G_{B10}$ 11/11 | $G_{B11}$ 11/11 | $G_{B12}$ 11/11 |

TABLE 3

| | | Security Feature Sensor | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Compensation Sensor | A | $G_{A1}$ | $G_{A2}$ | $G_{A3}$ | $G_{A4}$ | $G_{A5}$ | $G_{A6}$ | $G_{A7}$ | $G_{A8}$ | $G_{A9}$ | $G_{A10}$ | $G_{A11}$ | $G_{A12}$ |
| | | 11/11 | 10/11 | 9/11 | 8/11 | 7/11 | 6/11 | 5/11 | 4/11 | 3/11 | 2/11 | 1/11 | 0 |
| | C | $G_{C1}$ | $G_{C2}$ | $G_{C3}$ | $G_{C4}$ | $G_{C5}$ | $G_{C6}$ | $G_{C7}$ | $G_{C8}$ | $G_{C9}$ | $G_{C10}$ | $G_{C11}$ | $G_{C12}$ |
| | | 0 | 1/11 | 2/11 | 3/11 | 4/11 | 5/11 | 6/11 | 7/11 | 8/11 | 9/11 | 10/11 | 11/11 |

Alternatively, nonlinear profiles, e.g. parabolic or cubic, are also possible for the weighting factor profiles depicted in tables 1 to 3 if they allow better weighting of the disturbances that are to be expected. The weighting factors $G_{ji}$ can be stored in the evaluation unit 23 e.g. in the style of a family of characteristic curves on the basis of the actual sensor arrangement, so that sensor arrangements other than those corresponding to tables 1 to 3 are also possible.

After ascertaining the weighting factors $G_{ji}$ using table 1 the evaluation device 23 then calculates (S130) a compensation factor $K_{ji}$ for the respective security feature sensor 1-12 based on the ratio of the ascertained disturbance variables $S_i$, $S_j$ of the security feature sensor 1-12 and the compensation sensor A-C and of the weighting factor $G_{ji}$ as follows:

$$K_{ji} = \frac{s_i}{s_j} G_{ji} \tag{1}$$

That is to say that in this case three compensation factors $K_{Ai}$, $K_{Bi}$, and $K_{Ci}$ are calculated for each security feature sensor 1-12.

The presence of the compensation factors $K_{ji}$ allows the remainder of the method to be performed even when a banknote is transported through below the security feature sensors 1-12 and the compensation sensors A-C and possibly a security feature of the banknote is captured by one or more of the security feature sensors 1-12.

Subsequently, the evaluation device 23 then calculates (S140) a compensation value $W_i$ (value for estimating the disturbance at the respective security feature sensor 1-12) for the respective security feature sensor 1-12 based on the compensation factors $K_{ji}$ and the measured values $M_j$ as follows:

$$W_i = K_{Ai} M_A + K_{Bi} M_B + K_{Ci} M_C \tag{2}$$

FIG. 3 depicts the compensation values $W_i$ by way of example, on the basis of the disturbances S1, S2 for the security feature sensors 1-12 over the course of time (compensation image). Values of the compensation sensors A-C are not depicted. It can be seen that the compensation values $W_i$ are all the more precisely consistent with the disturbances S1, S2 the closer the associated security feature sensors 1-12 are to the compensation sensors A-C. The effect achieved by the weighting is that both disturbances S1, S2 are also adequately mapped for the security feature sensors further away from the compensation sensors A-C (cf. for example third and fourth security feature sensors 3, 4).

Finally, the evaluation device 23 calculates (S150) a compensated measured value $kM_i$ of the respective security feature sensor 1-12 as follows:

$$kM_i = M_i - W_i \tag{3}$$

FIG. 4 depicts the compensated measured values $kM_i$ for the security feature sensors 1-12 over the course of time by way of example (without a captured security feature of the banknote). Values of the compensation sensors A-C are not depicted. It can be seen that the disturbances S1, S2 have no or just a weak influence on the security feature sensors 1-12. The compensated measured values $kM_i$ are used for capturing a security feature of a banknote (S160). It is evident that the compensated measured values $kM_i$ of the security feature sensors 1-12 have only weak disturbances or are undisturbed.

It is also possible for the measured values $M_i$, $M_j$, the compensation values $W_i$ and/or the compensated measured values $kM_i$ to be filtered in order to reduce disturbances on the security feature sensors 1-12 even further. This can be disturbances as a result of electrical installations (mains hum) or as a result of temperature changes, for example.

What is claimed is:

1. An apparatus for detecting a magnetic security feature of a valuable document comprising:

a transport apparatus, configured to transport the valuable document through the apparatus on a transport plane in a direction of transport;

sensors configured as magnetic sensors and having at least two security feature sensors and at least one compensation sensor, wherein the sensors are arranged and configured in a line parallel to the transport plane and transversely with respect to the direction of transport such that transport of the valuable document past the line of sensors results in the security feature sensors each capturing an individual strip of the valuable document in the direction of transport;

wherein the sensors are arranged at a distance from the transport plane such that the distance of the security feature sensors from the transport plane is configured to capture a security feature by at least one of the security feature sensors, and that the distance of the compensation sensor from the transport plane is configured not to capture a security feature by the compensation sensor; and an evaluation unit configured to receive the signals output by the sensors.

2. The apparatus according to claim 1, wherein the compensation sensor(s) are arranged symmetrically in relation to a centre of the line.

3. The apparatus according to claim 1, wherein a respective compensation sensor is arranged at the start and at the end of the line.

4. The apparatus according to claim 1, wherein the distance of the security feature sensors from the transport plane is 1.8 mm to 0.5 mm.

5. The apparatus according to claim 1, wherein the distance of the compensation sensor(s) from the transport plane is 5 mm to 10 mm.

6. The apparatus according to claim 1, wherein the sensors are configured as magnetic sensors of the same type.

7. The apparatus according to claim 1, wherein the valuable document is one of:

a bank note;
a cheque;
an identity card;
a passport;
a travel ticket; and
a share document.

8. The apparatus according to claim 1, wherein the distance of the security feature sensors from the transport plane is 1.3 mm.

9. The apparatus according to claim 1, wherein the distance of the security feature sensors from the transport plane is 0.5 mm.

10. The apparatus according to claim 1, wherein the evaluation unit is configured to:

receive signals from the security feature sensors and the compensation sensor of a respective measured value, ascertain a disturbance variable of the respective security feature and compensation sensor based on the measured value of said sensor, ascertain a weighting factor for the respective security feature sensor on the basis of a distance of the security feature sensor from the compensation sensor, calculate a compensation factor for the respective security feature sensor based on the ratio of the captured disturbance variables of the security feature sensor and of the compensation sensor and on the weighting factor, calculate a compensation value for the respective security feature sensor based on the compensation factor and the measured value, and calculate a compensated measured value of the respective security feature sensor.

11. The apparatus according to claim 10, wherein the evaluation unit is configured to detect a security feature using the compensated measured value when a valuable document is transported past the sensors.

12. A method for measured value compensation for the detection of a magnetic security feature of a valuable document transported by an apparatus having at least two security feature sensors and at least one compensation sensor, wherein the sensors are configured as magnetic sensors, the method involving, before a valuable document is transported past the sensors:

capturing, by the security feature sensors and the compensation sensor, a respective measured value, ascertaining a disturbance variable of the respective security feature and compensation sensor based on the measured value of said sensor, ascertaining a weighting factor for the respective security feature sensor on the basis of a distance of the security feature sensor from the compensation sensor, calculating a compensation factor for the respective security feature sensor based on the ratio of the captured disturbance variables of the security feature sensor and of the compensation sensor and on the weighting factor, calculating a compensation value for the respective security feature sensor based on the compensation factor and the measured value, and calculating a compensated measured value of the respective security feature sensor.

13. The method according to claim 12, further involving:

detecting a security feature using the compensated measured value, when a valuable document is transported past the sensors.

14. The method according to claim 12, wherein the disturbance variable is ascertained using a standard deviation or a route mean square of multiple measured values.

15. The method according to claim 12, wherein if a single compensation sensor is used then the ascertaining of the weighting factor results in a weighting factor that is the same for all the security feature sensors being ascertained.

16. The method according to claim 12, wherein if multiple compensation sensors are used then the ascertaining of the weighting factor results in one weighting factor per compensation sensor being ascertained for a respective security feature sensor that decreases as the distance of the security feature sensor from the associated compensation sensor increases.

17. The method according to claim 12, wherein if a single compensation sensor is used then the calculating of the compensation factor for the security feature sensor results in an extrapolation of the disturbance variable ratio from the compensation sensor being effected based on the weighting factor, or if multiple compensation sensors are used then a piecewise linear interpolation of the disturbance variable ratio between the compensation sensors is effected based on the weighting factors.

18. The method according to claim 12, wherein the ascertaining of the weighting factor results in a value in the order of magnitude of the signal noise of the sensors being added to the weighting factor.

19. An automated teller machine comprising:

a transport apparatus, configured to transport a valuable document through the transport apparatus on a transport plane in a direction of transport;

sensors configured as magnetic sensors and having at least two security feature sensors and at least one compensation sensor, wherein the sensors are arranged and configured in a line parallel to the transport plane and transversely with respect to the direction of transport such that transport of the valuable document past the line of sensors results in the security feature sensors each capturing an individual strip of the valuable document in the direction of transport;

wherein the sensors are arranged at a distance from the transport plane such that the distance of the security feature sensors from the transport plane is configured to capture a security feature by at least one of the security feature sensors, and that the distance of the compensation sensor from the transport plane is configured not to capture a security feature by the compensation sensor; and an evaluation unit configured to receive the signals output by the sensors and, upon receiving the signals output by the sensors:

ascertain a disturbance variable of the respective security feature and compensation sensor based on the measured value of said sensor, ascertain a weighting factor for the respective security feature sensor on the basis of a distance of the security feature sensor from the compensation sensor, calculate a compensation factor for the respective security feature sensor based on the ratio of the captured disturbance variables of the security feature sensor and of the compensation sensor and on the weighting factor, calculate a compensation value for the respective security feature sensor based on the compensation factor and the measured value, and calculate a compensated measured value of the respective security feature sensor.

20. The automated teller machine of claim 19, wherein the evaluation unit is configured to detect a security feature using the compensated measured value when a valuable document is transported past the sensors.

* * * * *